(12) United States Patent
Lin

(10) Patent No.: US 6,479,913 B1
(45) Date of Patent: Nov. 12, 2002

(54) ELECTRIC MOTOR HAVING A NO-ADJUST STARTING SWITCH

(75) Inventor: Chih Min Lin, Tipp City, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/850,226

(22) Filed: May 7, 2001

(51) Int. Cl.[7] .......................... H01H 35/10; H02K 11/00
(52) U.S. Cl. .................. 310/68 E; 200/80 B; 200/80 R
(58) Field of Search ...................... 200/80 R, 80 B; 310/68 E, 69, 68 A

(56) References Cited

U.S. PATENT DOCUMENTS

| | | | |
|---|---|---|---|
| 1,604,497 A | 10/1926 | Stocking | |
| 2,493,140 A | 1/1950 | Heath | |
| 2,991,340 A | * 7/1961 | Bickham | 200/80 R |
| 3,660,741 A | 5/1972 | Walter | |
| 4,315,118 A | * 2/1982 | Kramer et al. | 200/80 R |
| 4,689,452 A | * 8/1987 | Quick | 200/80 R |
| 4,885,440 A | 12/1989 | Kachuk | |
| 4,894,496 A | * 1/1990 | Palumbo | 200/80 R |
| 4,958,096 A | 9/1990 | Kachuk | |
| 5,220,226 A | 6/1993 | Long et al. | |
| 5,291,086 A | 3/1994 | Shekalim | |

* cited by examiner

Primary Examiner—Burton S. Mullins
(74) Attorney, Agent, or Firm—Michael Best & Friedrich LLP

(57) ABSTRACT

An electric motor having a no-adjust starting switch. An actuator button of a starting switch assembly is slidably positioned in a switch housing mounted to an end frame of the motor. As a rotor shaft and associated centrifugal governor which engages the actuator button rotate, there is minimal wobbling of the actuator button during motor start-up and motor operation.

30 Claims, 4 Drawing Sheets

ELECTRIC MOTOR HAVING A NO-ADJUST STARTING SWITCH

FIELD OF THE INVENTION

The present invention relates generally to electric motors incorporating a centrifugal governor mounted to a rotor shaft of the motor, and a starting switch which is allowed to open or close depending on the rotational speed of the rotor shaft.

BACKGROUND OF THE INVENTION

Many electric motors include governor assemblies which react to changes in the rotational speed of a rotor shaft to open and close an electric switch. Centrifugal governors generally utilize the centrifugal force generated by rotation of the shaft to engage and disengage an electric starting switch. Illustrated in FIG. 9 is a known starting switch assembly 10 and governor assembly 14. The starting switch assembly 10 includes a bracket 18 mounted to the motor end frame 22 with a mounting screw 26, a switch plate 30 mounted to the bracket 18, and a pair of elongated arms or terminal blades 34 and 38 which are supported by switch plate 30 and each of which includes an associated electric contact 42 and 46. An actuator button 50 is attached to arm 34. The governor assembly 14 includes a spring 52 and a pivot plate 54, and the governor assembly 14 is mounted to the rotor shaft 58. During the power off mode, and during start-up and until the shaft 58 reaches a predetermined rotational speed, the spring 52 causes the pivot plate 54 to contact the actuator button 50 to force the arms 34 and 38 and, therefore, the contacts 42 and 46, together to close the electric switch. After the shaft 58 reaches the predetermined rotational speed, centrifugal forces acting on the pivot plate 54 overcome the force of the spring 52 and cause the pivot plate 54 to pivot in a direction (i.e., a counterclockwise direction as shown in FIG. 9) which allows the actuator button 50 to move in a direction that enables the arms 34 and 38 and, therefore, the contacts 42 and 46, to separate to open the electric switch.

SUMMARY OF THE INVENTION

With continued reference to FIG. 9, during start-up and until the shaft 58 reaches the predetermined rotational speed, the spring 52 causes the pivot plate 54 to push the actuator button 50 away from the end 62 of the shaft 58, such that the bottom surface 66 of the actuator button 50 is not perpendicular to the centerline 70 of the shaft 58. As can be appreciated, during start-up and operation of the motor, the governor assembly 14 spins with the rotor shaft 58. The spinning action of the governor assembly 14 and the non-perpendicular engagement between the pivot plate 54 and the bottom surface 66 of the actuator button 50 can cause the actuator button 50 to wobble. Wobbling of the actuator button 50 can result in intermittent arcing between the electric contacts 42 and 46. In order to offset the wobbling action of the actuator button 50, it is known to utilize a significant portion of the available stroke or pivotal movement of the pivot plate 54 of the governor assembly 14. In this way, the engagement between the pivot plate 54 and the actuator button 50 prevents the electric contacts 42 and 46 from separating as the actuator button 50 wobbles. It has been observed that a problem with using a significant portion of the available pivotal movement of the pivot plate 54 to offset the wobbling action of the actuator button 50 is that there may not be a sufficient amount of pivotal movement left for the pivot plate 54 to absorb the stack-up tolerances associated with assembly of the electric motor. In other words, during operation of the electric motor, after the shaft 58 has reached a predetermined rotational speed, there may not be a sufficient amount of stroke left in the pivot plate 54 so as to allow the electric starting switch to open, thereby resulting in possible damage to the starting switch or even the electric motor itself. For example, if a significant portion of the available stroke of the pivot plate 54 is reserved to offset the wobbling action of the actuator button 50, and the length of the shaft 58 is near the high end of the allowed tolerance range, after the shaft 58 reaches the predetermined rotational speed, the pivot plate 54 may not move a sufficient amount to allow the electric contacts 42 and 46 to separate. Consequently, careful adjustment is required to obtain the proper relationship between the switch assembly 10 and the governor assembly 14.

To address the foregoing problems and other problems, the present invention provides an electric motor which includes a "no-adjust" starting switch. The starting switch according to the present invention does not require any reservation of the available stroke of a pivot plate of a governor assembly to offset wobbling of an actuator button because, for one reason, the actuator button is prevented from wobbling. One advantage of such an arrangement is that the entire available stroke of the pivot plate of the governor assembly can be used to offset the stack-up tolerances of the motor assembly.

According to one aspect of the present invention, a switch actuator button remains substantially parallel to the centerline of a rotor shaft at all times. As a result, there is minimal wobbling of the actuator button during motor start-up and motor operation. In one embodiment of the present invention, the actuator button is not secured to either terminal blade of the starting switch, so that the actuator button is better able to stay substantially parallel to the centerline of the rotor shaft. In another embodiment of the present invention, the actuator button is constrained for movement parallel to or along the centerline of the rotor shaft to further ensure that the actuator button will not wobble during motor start-up and motor operation. Preferably, a switch housing is provided to simplify the placement of the starting switch into the electric motor, and the switch housing includes an aperture through which the actuator button is slidably positioned, so that during rotation of the rotor shaft, the actuator button is constrained for movement along the centerline of the shaft.

Other features and advantages of the invention will become apparent to those skilled in the art upon review of the following detailed description, claims and drawings in which like numerals are used to designate like features.

Figure 1:
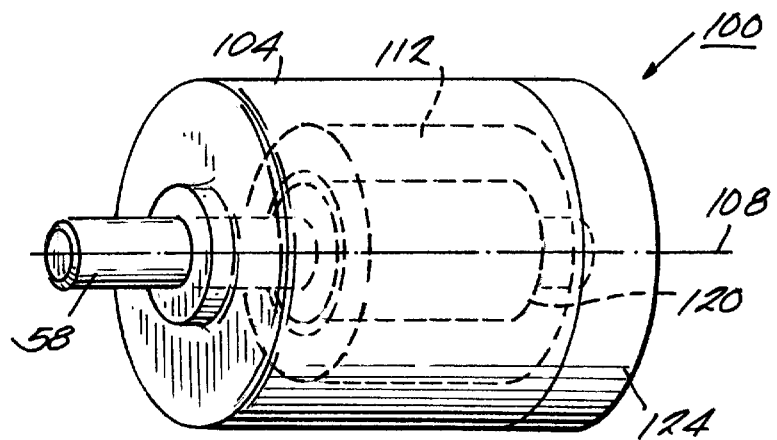
FIG. 1 is a perspective view of an electric motor embodying the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION OF THE PREFERRED EMBODIMENT

Illustrated in FIG. 1 is an electric motor 100 embodying the invention. It should be understood that the present invention is capable of use in other electric motors and the electric motor 100 is merely shown and described as an example of one such motor. The motor 100 includes a housing 104 having an axis 108, a stator 112 supported by the housing 104, a shaft 58 supported by the housing 104 for rotation about the axis 108, and a rotor 120 supported by the shaft 58 for rotation therewith relative to the stator 112. In conjunction with FIG. 2, an end cover 124 is attached to the motor end frame 128 to surround a starting switch assembly 132, which is described in greater detail below, and other components. The motor 100 further includes a governor assembly 14 secured to end 62 of the shaft 58, the governor assembly 14 including a spring 52 and a pivot plate 54, as previously described.

Figure 4:
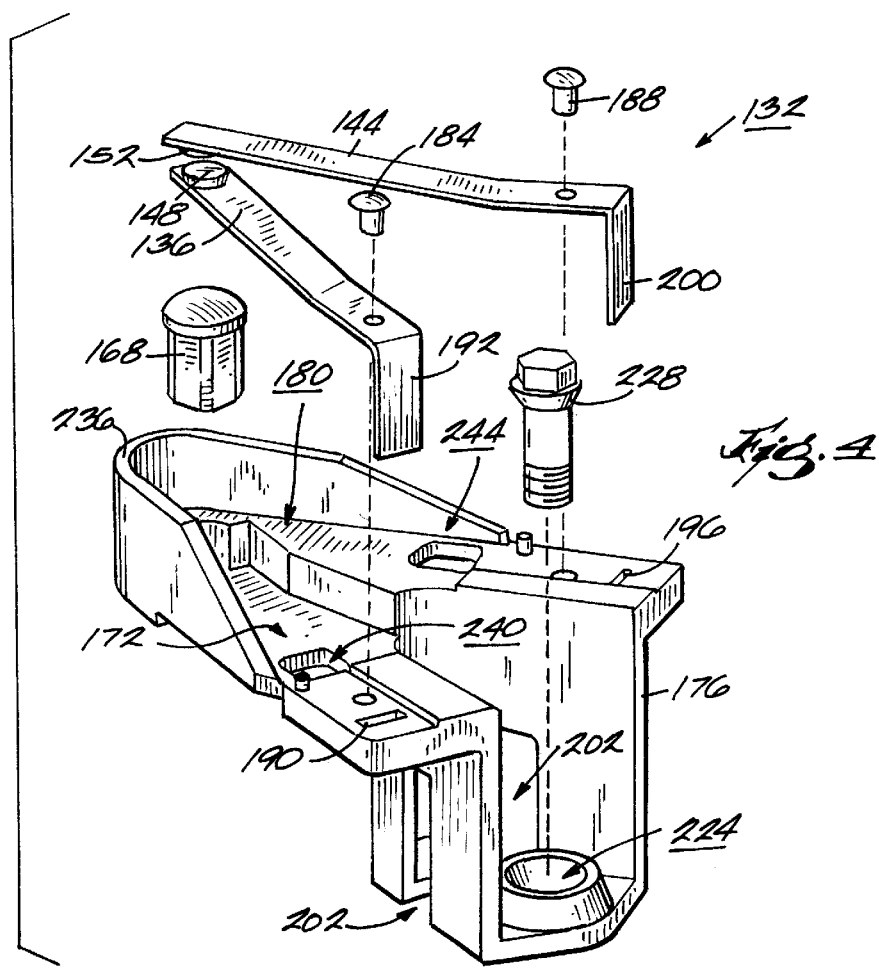
FIG. 4 is an exploded view of the starting switch assembly of FIG. 3.
Figure 5:
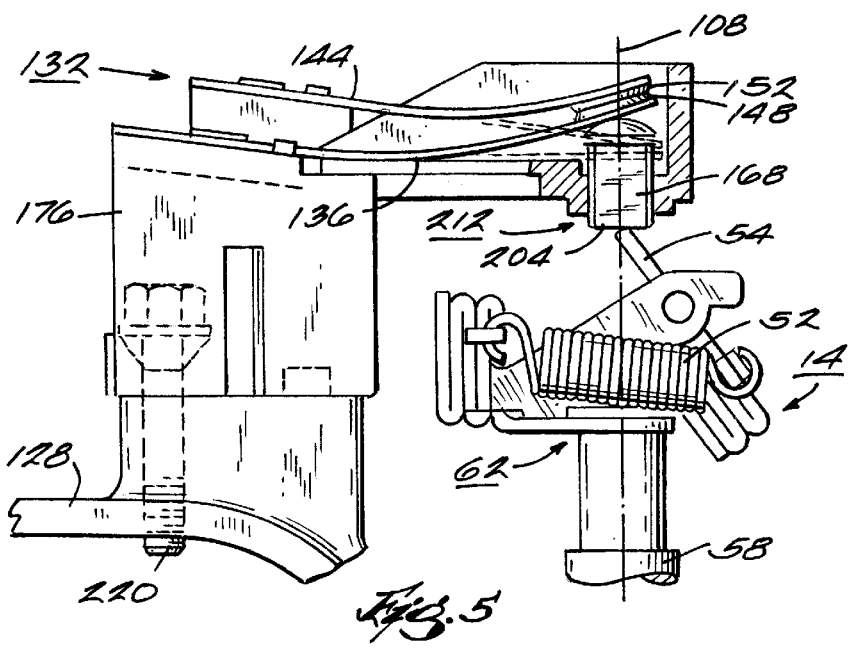
FIG. 5 is a partial cross-sectional view of the starting switch assembly of FIG. 3 mounted to a motor end frame of the electric motor of FIG. 1.

With reference to FIG. 4, the starting switch assembly 132 includes a pair of flexible, elongated arms or terminal blades 136 and 144. Arm 136 includes an electrical contact 148 and arm 144 includes an electrical contact 152. Referring now to FIG. 5, during start-up of the motor 100 and until the shaft 58 reaches a predetermined rotational speed, spring 52 causes the pivot plate 54 to engage an actuator button 168 of the starting switch assembly 132 to force the arms 136 and 144 and, therefore, the contacts 148 and 152, together to close the starting switch. After the shaft 58 has reached the predetermined rotational speed, centrifugal forces acting on the pivot plate 54 overcome the force of the spring 52 and cause the pivot plate 54 to pivot in a direction (i.e., a counterclockwise direction as shown in FIG. 5) which allows the actuator button 168 to move in a direction that enables the arms 136 and 144 and, therefore, the contacts 148 and 152, to separate (illustratively shown as the dashed lines in FIG. 5) to open the starting switch. Although not readily apparent, when the arms 136 and 144 are separated, arm 136 rests on a ledge 172 (FIG. 4) of a switch housing 176 (FIG. 4) of the starting switch assembly 132, and arm 144 rests on a ledge 180 (FIG. 4) of the switch housing 176. Ledge 180 is slightly raised above ledge 172 to ensure the separation of the arms 136 and 144 when the arms 136 and 144 rest on the ledges 172 and 180.

Figure 2:
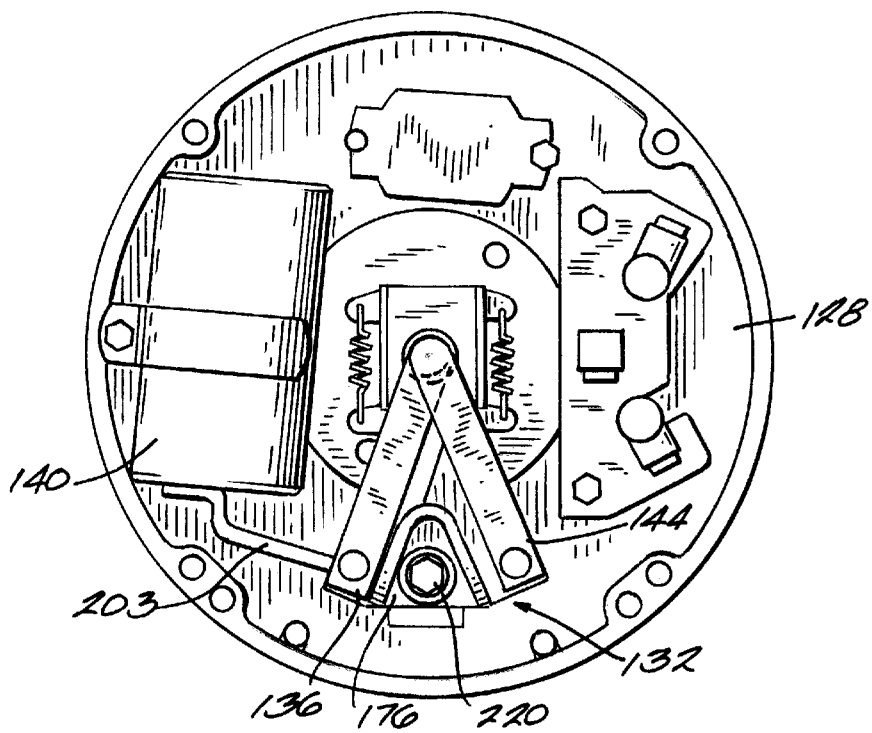
FIG. 2 is an end view of the electric motor of FIG. 1 with an end cover removed.
Figure 3:
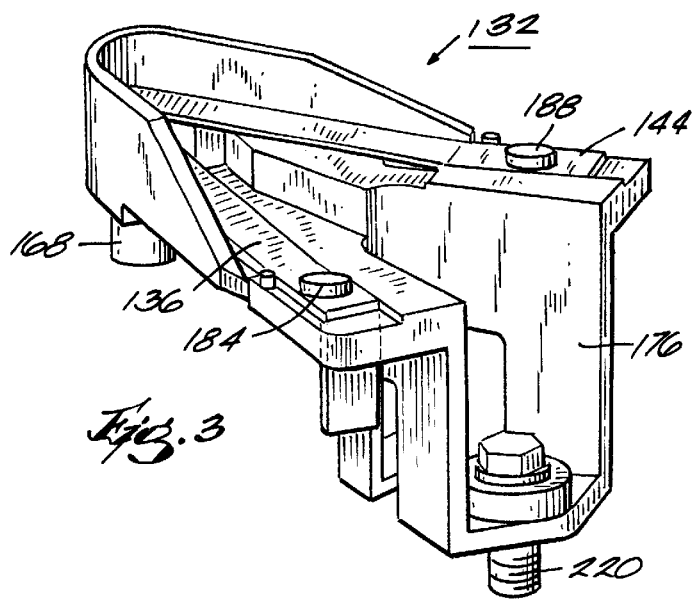
FIG. 3 is a perspective view of a starting switch assembly according to the present invention.

With reference to FIGS. 3 and 4, arm 136 is secured to the switch housing 176 by rivet 184 and arm 144 is secured to switch housing 176 by rivet 188. Slot 190 of the switch housing 176 receives the terminal portion 192 of arm 136 and slot 196 of the switch housing 176 receives the terminal portion 200 of arm 144, so as to properly locate the arms 136 and 144 on the switch housing 176. The switch housing 176 includes openings 202 for receiving and guiding electrical wires or the like connected to the terminal portions 192 and 200, thereby inhibiting the electrical wires from tangling with moving components of the motor 100. As shown in FIG. 2, terminal blade 136 of the starting switch assembly 132 is electrically coupled to a capacitor 140 via wire 203 (although, it should be noted that capacitor 140 is not utilized in all electric motors in which the present invention can be employed), and the other terminal blade 144 of the starting switch assembly 132 is electrically coupled to a start winding (not shown) as conventionally understood.

Figures 6, 7:
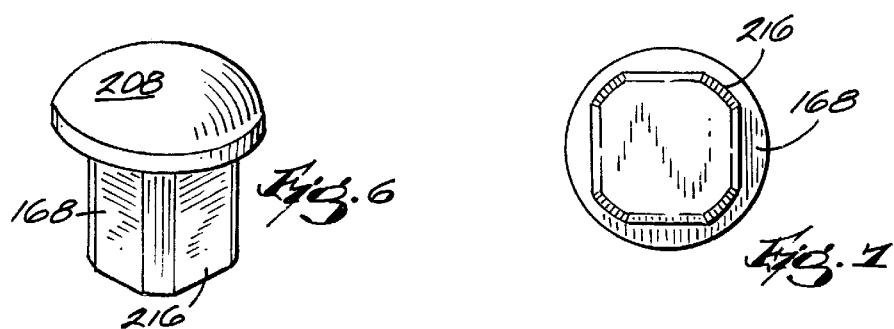
FIG. 6 is a perspective view of an actuator button of the starting switch assembly of FIG. 3.
FIG. 7 is a bottom view of the actuator button of FIG. 6.
Figure 9:
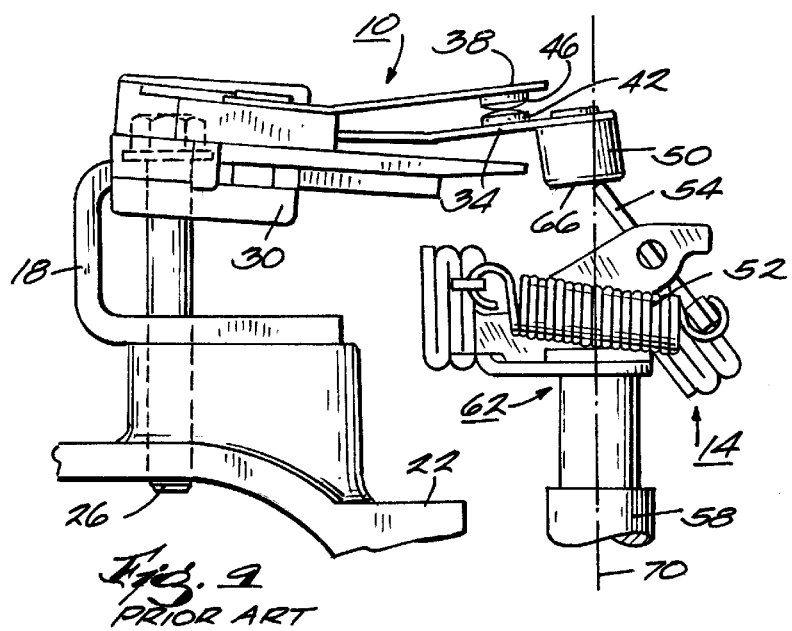
FIG. 9 is a plan view of a prior known starting switch assembly mounted to a motor end frame of an electric motor.

A feature of the present invention is that unlike the starting switch assembly 10 of FIG. 9, the actuator button 168 of the starting switch assembly 132 is substantially prevented from wobbling. Referring again to FIG. 5, the axis 108 of the shaft 58 extends through the actuator button 168, and the actuator button 168 moves along the axis 108 during rotation of the shaft 58. The actuator button 168 includes a substantially flat surface 204 which is generally perpendicular to the axis 108 and which engages the pivot plate 54. The actuator button 168 further includes a hemispherical dome 208 (FIG. 6) that engages arm 136 during start-up of the motor and until at least the rotation of the shaft 58 reaches the predetermined rotation. The actuator button 168 is slidably positioned within an aperture 212 of the switch housing 176 so that the actuator button 168 is substantially constrained for movement along the axis 108, i.e., the surface 204 remains substantially perpendicular to the axis 108 as the actuator button 168 moves along the axis 108. The actuator button 168 includes a generally non-cylindrical body 216 (FIGS. 6 and 7) which is matingly received by the aperture 212 of the switch housing 176, so that during rotation of the shaft 58, the actuator button 168 is prevented from spinning within the aperture 212. As the shaft 58 rotates, the pivot plate 54 moves about the axis 108. However, because the actuator button 168 is constrained to move along the axis 108, the surface 204 of the actuator button 168 remains substantially perpendicular to the axis 108 and the engagement between the pivot plate 54 and the surface 204 will not cause the actuator button 168 to appreciably wobble.

Figure 8:
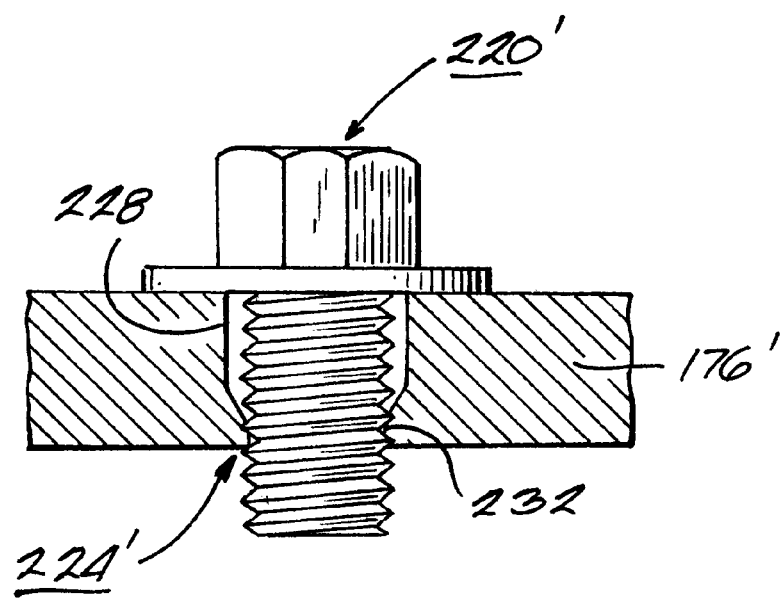
FIG. 8 is a cross-sectional view of an alternative embodiment for mounting a starting switch assembly according to the present invention to the motor end frame of the electric motor of FIG. 1.

Referring back now to FIG. 2, the switch housing 176 is mounted to the end frame 128 and, therefore the housing 104, by screw 220 extending through an aperture 224 (FIG. 4) in the switch housing 176 and then into the end frame 128. The screw 220 includes a conical shoulder 228 (FIG. 4) and the aperture 224 is configured to receive the conical shoulder 228 of the screw 220. In this way, the screw 220 is self-aligning with respect to the switch housing 176 when mounting the switch housing 176 to the end frame 128. An alternative self-aligning arrangement is shown in FIG. 8, wherein the aperture 224' is configured to include an upper portion 228 having a larger diameter than the screw 220' to provide clearance therebetween, and a lower portion 232 having a slightly smaller diameter than the screw 220' to provide a threaded fit between the screw 220' and the lower portion 232. Preferably, the switch housing 176' is made of a plastic material and the lower portion 232 can be tapped with a standard hex-head machine screw 220'. Referring now to FIGS. 3 and 4, the switch housing 176 further includes an outwardly projecting wall 236 positioned adjacent to and extending along the arms 136 and 144 to protect the arms 136 and 144 from damage and to act as a shield to contain any arcing which may be transmitted by the arms 136 and 144. Lastly, the switch housing 176 includes a first opening 240 positioned below arm 136 and a second opening 244 positioned below arm 144. The openings 240 and 244 reduce the accumulation of sand, dirt or other undesirable contaminants below the arms 136 and 144, that if occurs, could adversely affect the operation of the starting switch.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An electric motor comprising:
    a housing;
    a stator supported by said housing;
    a shaft supported by said housing for rotation about an axis;
    a rotor supported by said shaft for rotation therewith relative to said stator;
    a switch supported by said housing, said switch including a pair of flexible, elongated arms;
    a switch actuator button which is not fixed to either arm; and
    a centrifugal governor mounted on said shaft for rotation therewith, such that as said shaft rotates, said governor causes said actuator button to force said arms together to close said switch until such time as said shaft reaches a predetermined rotational speed, after which, centrifugal forces generated by said shaft and acting upon said governor cause said governor to allow said actuator button to move in a direction that allows said arms to separate, thereby opening said switch.

2. An electric motor according to claim 1, wherein said axis extends through said actuator button, and wherein said actuator button moves along said axis during rotation of said shaft.

3. An electric motor according to claim 1, wherein said actuator button includes a substantially flat surface which is generally perpendicular to said axis and which engages said governor during rotation of said shaft.

4. An electric motor according to claim 1, wherein said actuator button includes a hemispherical dome which engages one of said arms during rotation of said shaft, at least until such time as said shaft reaches the predetermined rotational speed.

5. An electric motor according to claim 1, further comprising a switch housing which supports said switch and which is mounted to said housing of said electric motor, said switch housing having an aperture through which said axis extends, and through which said actuator button is slidably positioned, so that during rotation of said shaft, said actuator button is constrained for movement along said axis.

6. An electric motor according to claim 5, wherein said actuator button includes a generally non-cylindrical body, so that during rotation of said shaft, said actuator button is prevented from spinning within said aperture.

7. An electric motor according to claim 5, wherein said switch housing includes an outwardly projecting wall positioned adjacent to and extending along said arms to protect said arms from damage and to act as a shield to contain arcing transmitted by said arms.

8. An electric motor according to claim 5, wherein said switch housing includes a first opening positioned below one arm and a second opening positioned below the other arm, said openings reducing accumulation of sand, dirt or other undesirable contaminants below said arms.

9. An electric motor according to claim 5, wherein said switch housing includes a second aperture through which a screw extends to mount said switch housing to said housing of said electric motor, the screw including a conical shoulder and said second aperture being adapted to receive the conical shoulder of the screw, so that the screw is self-aligning with respect to said switch housing when mounting said switch housing to said housing of said electric motor.

10. An electric motor according to claim 5, wherein said switch housing includes a pair of openings for receiving and guiding electrical wires connected to terminal portions of said arms, thereby inhibiting said electrical wires from tangling with moving components of said motor.

11. An electric motor according to claim 5, wherein said switch housing includes a first ledge positioned below one arm and a second ledge positioned below the other arm, such that when said arms separate, said first ledge supports its associated arm and said second ledge supports the other arm.

12. An electric motor according to claim 5, wherein said switch housing includes a second aperture through which a screw extends to mount said switch housing to said housing of said electric motor, said second aperture including an upper portion having a larger diameter than the screw so as to provide clearance between the screw and said upper portion, and said second aperture firther including a lower portion having a slightly smaller diameter than the screw so as to provide a threaded fit between the screw and said lower portion.

13. An electric motor comprising:
    a housing;
    a stator supported by said housing;
    a shaft supported by said housing for rotation about an axis;
    a rotor supported by said shaft for rotation therewith relative to said stator;
    a switch supported by said housing, said switch including a pair of flexible, elongated arms;
    a switch actuator button having a generally flat engagement surface, said actuator button being constrained for movement parallel to or along said axis, such that said engagement surface remains substantially perpendicular to said axis as said actuator button moves parallel to or along said axis; and
    a centrifugal governor mounted on said shaft for rotation therewith, such that as said shaft rotates, said governor engages said engagement surface of said actuator button to cause said actuator button to force said arms together to close said switch until such time as said shaft reaches a predetermined rotational speed, after which, centrifugal forces generated by said shaft and acting upon said governor cause said governor to allow said actuator button to move in a direction that allows said arms to separate, thereby opening said switch.

14. An electric motor according to claim 13, wherein said actuator button includes a hemispherical dome which engages one of said arms during rotation of said shaft, at least until such time as said shaft reaches the predetermined rotational speed.

15. An electric motor according to claim 13, further comprising a switch housing which supports said switch and which is mounted to said housing of said electric motor, said switch housing having an aperture through which said axis extends, and through which said actuator button is slidably positioned, so that during rotation of said shaft, said actuator button is constrained for movement along said axis.

16. An electric motor according to claim 15, wherein said actuator button includes a generally non-cylindrical body, so that during rotation of said shaft, said actuator button is prevented from spinning within said aperture.

17. An electric motor according to claim 15, wherein said switch housing includes an outwardly projecting wall positioned adjacent to and extending along said arms to protect said arms from damage and to act as a shield to contain arcing transmitted by said arms.

18. An electric motor according to claim 15, wherein said switch housing includes a first opening positioned below one arm and a second opening positioned below the other arm, said openings reducing accumulation of sand, dirt or other undesirable contaminants below said arms.

19. An electric motor according to claim 15, wherein said switch housing includes a second aperture through which a screw extends to mount said switch housing to said housing of said electric motor, the screw including a conical shoulder and said second aperture being adapted to receive the conical shoulder of the screw, so that the screw is self-aligning with respect to said switch housing when mounting said switch housing to said housing of said electric motor.

20. An electric motor according to claim 15, wherein said switch housing includes a pair of openings for receiving and guiding electrical wires connected to terminal portions of said arms, thereby inhibiting said electrical wires from tangling with moving components of said motor.

21. An electric motor according to claim 15, wherein said switch housing includes a first ledge positioned below one arm and a second ledge positioned below the other arm, such that when said arms separate, said first ledge supports its associated arm and said second ledge supports the other arm.

22. An electric motor according to claim 15, wherein said switch housing includes a second aperture through which a screw extends to mount said switch housing to said housing of said electric motor, said second aperture including an upper portion having a larger diameter than the screw so as to provide clearance between the screw and said upper portion, and said second aperture further including a lower portion having a slightly smaller diameter than the screw so as to provide a threaded fit between the screw and said lower portion.

23. An electric motor comprising:
   a housing;
   a stator supported by said housing;
   a shaft supported by said housing for rotation about an axis;
   a rotor supported by said shaft for rotation therewith relative to said stator;
   a switch supported by said housing, said switch including a pair of flexible, elongated arms;
   a switch actuator button which is not fixed to either arm, said switch actuator button having a generally flat engagement surface and a hemispherical dome for engaging one of said arms, said actuator button being constrained for movement parallel to or along said axis, such that said engagement surface remains substantially perpendicular to said axis as said actuator button moves parallel to or along said axis; and
   a centrifugal governor mounted on said shaft for rotation therewith, such that as said shaft rotates, said governor engages said engagement surface of said actuator button to cause said hemispherical dome of said actuator button to engage one of said arms to force said arms together to close said switch until such time as said shaft reaches a predetermined rotational speed, after which, centrifugal forces generated by said shaft and acting upon said governor cause said governor to allow said actuator button to move in a direction that allows said arms to separate, thereby opening said switch.

24. An electric motor according to claim 23, further comprising a switch housing which supports said switch and which is mounted to said housing of said electric motor, said switch housing having an aperture through which said axis extends, and through which said actuator button is slidably positioned, wherein said actuator button includes a generally non-cylindrical body, so that during rotation of said shaft, said actuator button is prevented from spinning within said aperture.

25. An electric motor according to claim 24, wherein said switch housing includes an outwardly projecting wall positioned adjacent to and extending along said arms to protect said arms from damage and to act as a shield to contain arcing transmitted by said arms.

26. An electric motor according to claim 24, wherein said switch housing includes a first opening positioned below one arm and a second opening positioned below the other arm, said openings reducing accumulation of sand, dirt or other undesirable contaminants below said arms.

27. An electric motor according to claim 24, wherein said switch housing includes a second aperture through which a screw extends to mount said switch housing to said housing of said electric motor, the screw including a conical shoulder and said second aperture being adapted to receive the conical shoulder of the screw, so that the screw is self-aligning with respect to said switch housing when mounting said switch housing to said housing of said electric motor.

28. An electric motor according to claim 24, wherein said switch housing includes a pair of openings for receiving and guiding electrical wires connected to terminal portions of said arms, thereby inhibiting said electrical wires from tangling with moving components of said motor.

29. An electric motor according to claim 24, wherein said switch housing includes a first ledge positioned below one arm and a second ledge positioned below the other arm, such that when said arms separate, said first ledge supports its associated arm and said second ledge supports the other arm.

30. An electric motor according to claim 24, wherein said switch housing includes a second aperture through which a screw extends to mount said switch housing to said housing of said electric motor, said second aperture including an upper portion having a larger diameter than the screw so as to provide clearance between the screw and said upper portion, and said second aperture further including a lower portion having a slightly smaller diameter than the screw so as to provide a threaded fit between the screw and said lower portion.

* * * * *